US009784645B2

United States Patent
Hosono et al.

(10) Patent No.: US 9,784,645 B2
(45) Date of Patent: Oct. 10, 2017

(54) ENGINE CONTROL DEVICE (71) Applicant: FUJI JUKOGYO KABUSHIKI KAISHA, Tokyo (JP)

(72) Inventors: Hiroyo Hosono, Tokyo (JP); Takumi Inaba, Tokyo (JP); Takahiro Futagami, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 29 days.

(21) Appl. No.: 15/064,372

(22) Filed: Mar. 8, 2016

(65) Prior Publication Data
US 2016/0281631 A1 Sep. 29, 2016

(30) Foreign Application Priority Data

Mar. 27, 2015 (JP) .................. 2015-065853

(51) Int. Cl.
*F02D 41/30* (2006.01)
*G01M 15/11* (2006.01)
(Continued)

(52) U.S. Cl.
CPC ........... *G01M 15/11* (2013.01); *F02D 35/028* (2013.01); *F02D 41/0235* (2013.01);
(Continued)

(58) Field of Classification Search
CPC ........ F02D 35/027; F02D 13/02; F02D 41/04; F02D 17/02; F02D 41/26; F02D 41/22;
(Continued)

(56) References Cited

U.S. PATENT DOCUMENTS 5,158,059 A * 10/1992 Kuroda ................. F01N 11/002
123/479
5,309,884 A * 5/1994 Fukui ...................... F02P 17/12
123/481
(Continued)

FOREIGN PATENT DOCUMENTS

JP 11-050878 A 2/1999
JP 11-050892 A 2/1999
(Continued)

OTHER PUBLICATIONS

Office Action received for Japanese Patent Application No. 2015-065853, mailed on Jan. 31, 2017, 2 pages of office action including 3 pages of English translation.
(Continued)

*Primary Examiner* — Hai Huynh
*Assistant Examiner* — Long T Tran
(74) *Attorney, Agent, or Firm* — Chip Law Group (57) ABSTRACT

An engine control device includes: a pre-ignition determination module that determines whether an operation state of an engine indicated by a rotation speed detected by a rotation speed detection unit and a load calculated by a load calculating module is in a pre-ignition occurring region; a catalyst protection determination module that determines whether the operation state of the engine is in a catalyst protection region; and a fuel cut execution control module that stops a fuel supplied to the engine, when a remaining amount of a fuel tank is determined to be smaller than a tank threshold value and the operation state is determined to be in the pre-ignition occurring region, and when the remaining amount of the fuel tank is determined to be smaller than the tank threshold value and the operation state is determined to be in the catalyst protection region.

4 Claims, 5 Drawing Sheets (51) Int. Cl.
*F02D 41/02* (2006.01)
*F02D 41/04* (2006.01)
*F01N 11/00* (2006.01)
*B60K 15/03* (2006.01)
*F02D 41/12* (2006.01)
*F02D 35/02* (2006.01)

(52) U.S. Cl.
CPC .. *F02D 41/042* (2013.01); *B60K 2015/03217* (2013.01); *B60K 2015/03328* (2013.01); *F01N 11/00* (2013.01); *F01N 2550/00* (2013.01); *F01N 2900/08* (2013.01); *F02D 35/027* (2013.01); *F02D 41/123* (2013.01); *F02D 2200/101* (2013.01)

(58) Field of Classification Search
CPC .... F02D 28/00; F02D 41/064; F02D 41/2432; F02D 41/30; F02D 41/40; F02D 13/06; F02D 41/123; F02D 41/345; F02D 2013/0292; F02D 41/06; F02D 41/222; F02D 41/065; F02D 41/3076; F02D 41/34

See application file for complete search history.

(56) References Cited

U.S. PATENT DOCUMENTS

| | | | | |
|---|---|---|---|---|
| 5,778,857 A | * | 7/1998 | Nakamura | F02D 35/023 123/406.29 |
| 7,017,558 B2 | * | 3/2006 | Osanai | F02M 25/0827 123/198 D |
| 7,774,130 B2 | * | 8/2010 | Pepper | B60W 40/12 340/439 |
| 8,316,824 B2 | * | 11/2012 | Hagari | F02D 13/0226 123/406.29 |
| 2010/0312459 A1 | * | 12/2010 | Utsumi | F02D 15/02 701/106 |
| 2011/0093186 A1 | * | 4/2011 | Hagari | F02D 13/0226 701/111 |
| 2011/0307158 A1 | * | 12/2011 | Imamura | F02D 13/06 701/102 |
| 2012/0031374 A1 | * | 2/2012 | Hokuto | F02D 35/027 123/445 |
| 2014/0277975 A1 | * | 9/2014 | Badillo | B60W 10/06 701/54 |

FOREIGN PATENT DOCUMENTS

| | | |
|---|---|---|
| JP | 2000-265888 A | 9/2000 |
| JP | 2000-337192 A | 12/2000 |
| JP | 2007-092530 A | 4/2007 |
| WO | 2013008296 A1 | 1/2013 |

OTHER PUBLICATIONS

Office Action received for Japanese Patent Application No. 2015-065853, mailed on Jul. 5, 2016, 11 pages of office action including 7 pages of English translation.

\* cited by examiner

ENGINE CONTROL DEVICE

CROSS-REFERENCE TO RELATED APPLICATIONS

The present application claims priority from Japanese Patent Application No. 2015-065853 filed on Mar. 27, 2015, the entire contents of which are hereby incorporated by reference.

BACKGROUND

1. Technical Field

The present invention relates to an engine control device that protects an engine.

2. Related Art

In the past, there has been proposed an engine control device that reduces the amount of fuel that is supplied to an engine at the time of fuel shortage in which a fuel tank has a little fuel remaining amount therein, in order to prevent an inoperable situation because of running out of fuel (refer to Japanese Unexamined Patent Application Publication (JP-A) No. 2000-337192, for example).

In the engine control device of above JP-A No. 2000-337192, a reduced amount of fuel is supplied to the engine at the time of fuel shortage, which makes an air-fuel ratio lean. Then, it is concerned that the lean air-fuel ratio causes a pre-ignition in which the fuel (air-fuel mixture) self-ignites in a combustion chamber before a normal ignition timing by a spark plug (hereinafter, referred to as pre-ignition), and the hardware of the engine is broken.

SUMMARY OF THE INVENTION

Thus, the purpose of the present invention is to provide an engine control device capable of protecting the hardware of the engine or the like appropriately at the time of fuel shortage.

To solve the above-described problem, an engine control device according to an aspect of the present invention includes: a remaining amount detection unit that detects a remaining amount of a fuel tank; a remaining amount determination module that determines whether the remaining amount of the fuel tank detected by the remaining amount detection unit is smaller than a tank threshold value indicating fuel shortage; a rotation speed detection unit that detects a rotation speed of an engine; a load calculating module that calculates a load of the engine; a pre-ignition determination module that determines whether an operation state of the engine indicated by the rotation speed detected by the rotation speed detection unit and the load calculated by the load calculating module is in a pre-ignition occurring region; a catalyst protection determination module that determines whether the operation state of the engine is in a catalyst protection region; and a fuel cut execution control module that stops a fuel supplied to the engine, when the remaining amount of the fuel tank is determined to be smaller than the tank threshold value and the operation state of the engine is determined to be in the pre-ignition occurring region, and when the remaining amount of the fuel tank is determined to be smaller than the tank threshold value and the operation state of the engine is determined to be in the catalyst protection region.

A fuel pressure detection unit that detects a pressure of the fuel supplied to the engine may be further included. The fuel cut execution control module may stop the fuel supplied to the engine, when a difference between the fuel pressure detected by the fuel pressure detection unit and a target fuel pressure continues to be equal to or larger than a fuel pressure threshold value for a first time or more.

An air-fuel ratio detection unit that detects an air-fuel ratio of the engine may be further included. The fuel cut execution control module may stop the fuel supplied to the engine, when the air-fuel ratio detected by the air-fuel ratio detection unit continues to be higher than an air-fuel ratio threshold value for a second time or more, the second time being longer than the first time.

To solve the above-described problem, an engine control device according to an aspect of the present invention includes: a remaining amount detection unit that detects a remaining amount of a fuel tank; a remaining amount determination module that determines whether the remaining amount of the fuel tank detected by the remaining amount detection unit is smaller than a tank threshold value indicating fuel shortage; a rotation speed detection unit that detects a rotation speed of an engine; a load calculating module that calculates a load of the engine; a pre-ignition determination module that determines whether an operation state of the engine indicated by the rotation speed detected by the rotation speed detection unit and the load calculated by the load calculating module is in a pre-ignition occurring region; and a fuel cut execution control module that stops a fuel supplied to the engine, when the remaining amount of the fuel tank is determined to be smaller than the tank threshold value and the operation state of the engine is determined to be in the pre-ignition occurring region.

DETAILED DESCRIPTION

Hereinafter, preferred implementations of the present invention will be described in detail with reference to the appended drawings. Size, material, and other specific numerical values that are mentioned in the examples are merely illustrations for facilitating understanding of the invention, and do not limit the present invention, if not stated otherwise. Note that, in this specification and the appended drawings, structural elements that have substantially the same function and structure are denoted with the same reference numerals, and repeated description of these structural elements is omitted. Also, elements having no direct relationship with the present invention are not depicted in the drawings.

Figure 1:
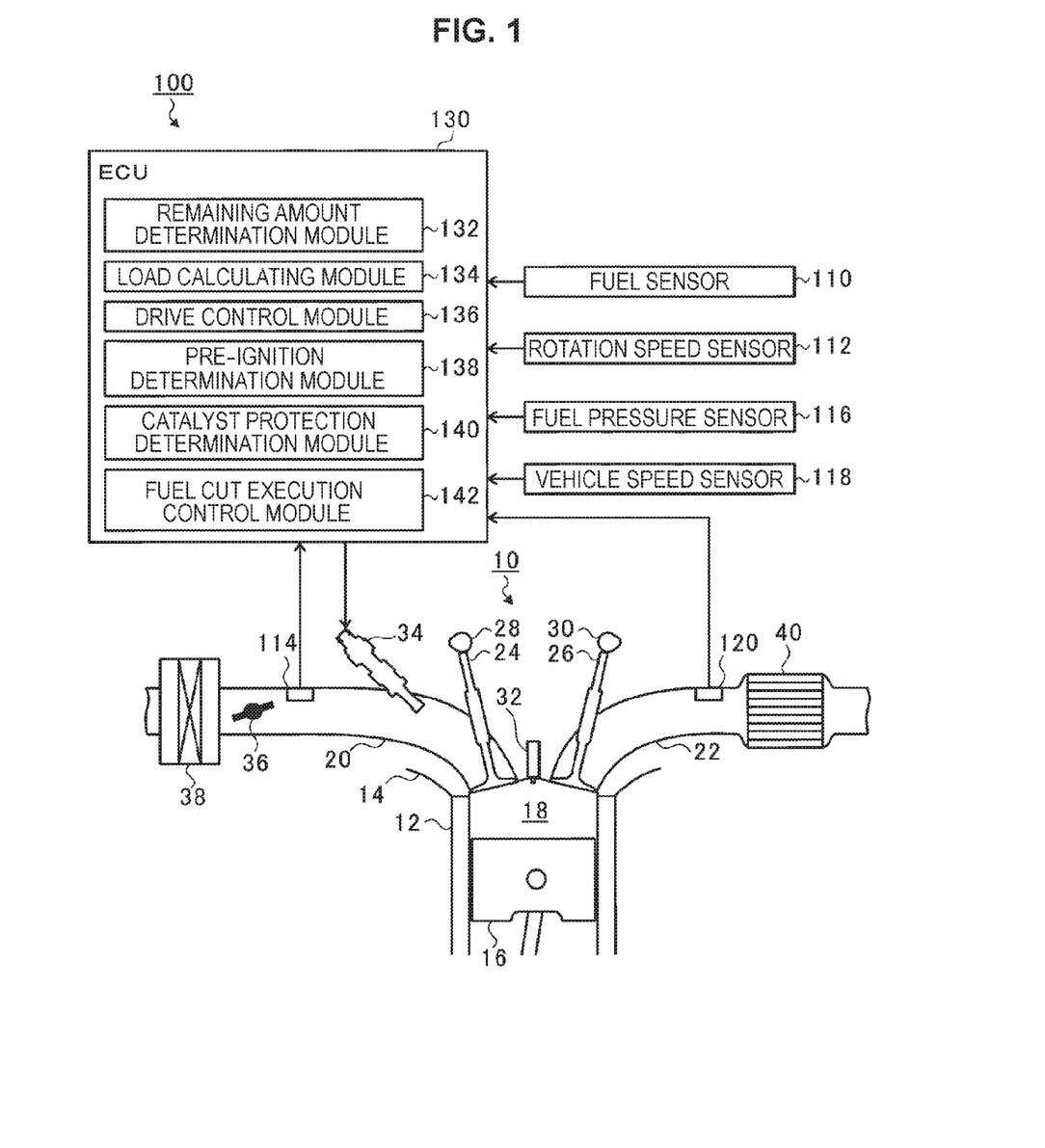
FIG. 1 is a schematic view illustrating a configuration of an engine control device.

FIG. 1 is a schematic view illustrating a configuration of an engine control device 100. Note that, in FIG. 1, flow of signals is indicated by the solid line arrows. Note that, in the following, the configuration and the process related to the present implementation will be described in detail, and the configuration and the process unrelated to the present implementation will not be described.

As illustrated in FIG. 1, an engine 10 includes a cylinder block 12, a cylinder head 14 provided on an upper portion of the cylinder block 12, and a piston 16 supported by a piston rod slidably in the cylinder block 12. Then, a space surrounded by the cylinder block 12, the cylinder head 14, and a top face of the piston 16 forms a combustion chamber 18.

In the cylinder head 14, an air intake passage 20 and an air exhaust passage 22 are in communication with the combustion chamber 18. The tip of an air intake valve 24 is positioned between the air intake passage 20 and the combustion chamber 18, and the tip of an air exhaust valve 26 is positioned between the air exhaust passage 22 and the combustion chamber 18. The air intake valve 24 contacts with an air intake valve cam 28 at the other end, and opens and closes between the air intake passage 20 and the combustion chamber 18 as the air intake valve cam 28 rotates. The air exhaust valve 26 contacts with an air exhaust valve cam 30 at the other end, and opens and closes between the air exhaust passage 22 and the combustion chamber 18 as the air exhaust valve cam 30 rotates.

Also, in the cylinder head 14, a spark plug 32 is provided in such a manner that its tip is positioned in the combustion chamber 18, and the spark plug 32 is ignited at a predetermined timing to combust the fuel that flows into the combustion chamber 18. With such combustion, the piston 16 moves back and forth, and this back and forth motion is converted to rotational motion of a crank shaft (not illustrated in the drawings) through the piston rod.

The air intake passage 20 is provided with an injector 34, a throttle valve 36, and an air cleaner 38 toward the upstream side from the engine 10 in the air intake passage 20.

The injector 34 is provided in the air intake passage 20, and is disposed in such a manner that its tip is directed to the combustion chamber 18. The fuel supplied from a fuel tank is injected from the injector 34.

The throttle valve 36 is driven by an actuator to be opened and closed according to an open degree of an accelerator (not illustrated in the drawings), in order to adjust an air amount that is supplied to the engine 10.

The air cleaner 38 removes impurities that are mixed in the air taken from outer air. After impurities are removed by the air cleaner 38, the air passes the throttle valve 36, and is led into the combustion chamber 18.

In the air exhaust passage 22, a catalyst device 40 is provided. For example, the catalyst device 40 is a three-way catalyst that includes platinum (Pt), palladium (Pd), and rhodium (Rh), and removes hydrocarbon (HC), carbon monoxide (CO), and nitrogen oxide (NOx) in the exhaust gas removed from the combustion chamber 18.

Also, in the engine control device 100, a fuel sensor 110, a rotation speed sensor 112, a flow meter 114, a fuel pressure sensor 116, a vehicle speed sensor 118, an air-fuel ratio sensor 120, and an ECU 130 are provided.

The fuel sensor (remaining amount detection unit) 110 is provided in the fuel tank (not illustrated in the drawings) to detect a fuel remaining amount (a liquid level) in the fuel tank. For example, the fuel sensor is a liquid level sensor utilizing a thermistor.

The rotation speed sensor (rotation speed detection unit) 112 is provided at the vicinity of the crank shaft of the engine 10, to detect a rotation speed (rpm) of the crank shaft (the engine 10).

The flow meter 114 is provided at the upstream side from the injector 34 in the air intake passage 20, to detect an air amount (g/min) passing the throttle valve 36 and supplied to the combustion chamber 18.

The fuel pressure sensor (fuel pressure detection unit) 116 detects a pressure of the fuel supplied to the engine 10, i.e., a fuel pressure (Mpa) at approximately 10 msec intervals.

The vehicle speed sensor 118 detects a running speed (vehicle speed) of a vehicle.

The air-fuel ratio sensor (air-fuel ratio detection unit) 120 is provided at the upstream side (the engine 10 side) from the catalyst device 40 in the air exhaust passage 22, in order to detect an air-fuel ratio (air by fuel (A/F)) of the exhaust gas removed from the combustion chamber 18.

The ECU 130 is a microcomputer including a central processing unit (CPU), a ROM storing a program and the like, a RAM as a work area, and centrally controls the engine control device 100 and the engine 10. In the present implementation, the ECU 130 serves as a remaining amount determination module 132, a load calculating module 134, a drive control module 136, a pre-ignition determination module 138, a catalyst protection determination module 140, and a fuel cut execution control module 142. Also, the ECU 130 acquires an electrical signal according to a detection result detected by each sensor.

In the meantime, at the time of fuel shortage (when running short of the fuel in the fuel tank), the fuel supplied into the combustion chamber 18 decreases, and the air-fuel ratio becomes lean, so that a pre-ignition in which the fuel self-ignites before the spark plug 32 ignites is likely to occur. In particular, a pre-ignition is likely to occur when the engine 10 has a high rotation speed and a high load. When the pre-ignition occurs, the pressure increases in the combustion chamber 18, and it is concerned that components of the engine 10 including the spark plug 32 are broken.

Also, at the time of fuel shortage, the fuel supplied into the combustion chamber 18 decreases, and the air-fuel ratio becomes lean, and thus it is concerned that the fuel that has flowed into the combustion chamber 18 is removed to the air exhaust passage 22 before combusting, and the uncombusted fuel combusts in the air exhaust passage 22, and the temperature of the exhaust gas rises. When the temperature of the exhaust gas rises, it is concerned that the catalyst device 40 is melted or broken.

Thus, the ECU 130 executes the following engine control process to reduce the pre-ignition and the rise of the exhaust gas temperature at the time of fuel shortage.

(Engine Control Process)

Figure 2:
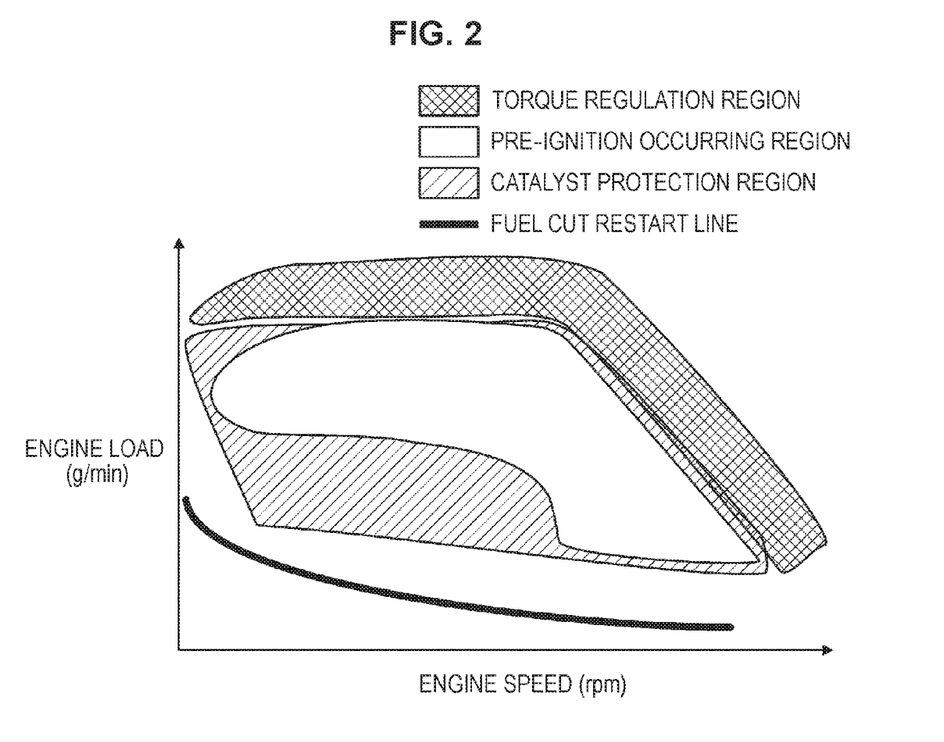
FIG. 2 is a diagram that describes a torque regulation region, a pre-ignition occurring region, and a catalyst protection region.

FIG. 2 is a diagram that describes a relationship between a torque regulation region, a pre-ignition occurring region, and a catalyst protection region, at the time of fuel shortage. The horizontal axis indicates a rotation speed (rpm) of the engine 10, and the vertical axis indicates a load (g/min) of the engine 10. In FIG. 2, the region indicated with cross-hatching is the torque regulation region, and the region indicated with white hollow space is the pre-ignition occurring region, and the region indicated with hatching is the catalyst protection region. Also, a curving line indicated with a solid line is a fuel cut restart line.

As illustrated in FIG. 2, the catalyst protection region in which combustion might occur in the air exhaust passage 22, and the pre-ignition occurring region in which pre-ignition might occur are superimposed on each other, and the most of the pre-ignition occurring region is positioned in the catalyst protection region. More specifically, the pre-ignition occurring region is positioned in the region in which one or both of the engine speed and the engine load are high in the catalyst protection region. Also, the torque regulation region in which the engine 10 might be suffer a high load is positioned at a higher load and a higher rotation speed, as compared with the pre-ignition occurring region and the catalyst protection region.

The remaining amount determination module 132 determines whether or not there is a fuel shortage, by determining whether the remaining amount of the fuel tank detected by the fuel sensor 110 is smaller than the tank threshold value indicating an ongoing fuel shortage.

Then, when the remaining amount determination module 132 determines that there is a fuel shortage, the drive control module 136 first performs control in such a manner that the load of the engine 10 does not become equal to or higher than a constant value (the first torque regulation). Specifically, as illustrated in FIG. 2, the drive control module 136 controls injection amount of fuel, intake air amount, ignite time, and the like as appropriate, in such a manner that the operation state of the engine 10 indicated by the rotation speed (engine speed) of the engine 10 and the load (engine load) of the engine 10 calculated by the load calculating module 134 does not become an operation state in the torque regulation region.

Thereafter, the pre-ignition determination module 138 determines whether the operation state of the engine 10 is in the pre-ignition occurring region (including the region that is superimposed on the catalyst protection region) illustrated in FIG. 2. When the operation state of the engine 10 is determined to be in the pre-ignition occurring region, the fuel cut execution control module 142 determines whether the fuel pressure detected by the fuel pressure sensor 116 fluctuates. When the fuel pressure is determined to fluctuate, the ECU 130 performs a pre-ignition occurrence prevention process described below. Also, when the operation state of the engine 10 is determined to be not in the pre-ignition occurring region, and when the operation state of the engine 10 is determined to be in the pre-ignition occurring region and the fuel pressure is determined to not fluctuate, the ECU 130 performs a catalyst device protection process described below.

(Pre-Ignition Occurrence Prevention Process)

First, the pre-ignition determination module 138 determines whether the operation state of the engine 10 is in the pre-ignition occurring region illustrated in FIG. 2. Specifically, the pre-ignition determination module 138 makes the determination on the basis of the operation state of the engine 10 and the map indicating the pre-ignition occurring region stored in the ROM in advance. Note that the pre-ignition occurring region is a region in which a pre-ignition might occur, and is a region in which the engine speed and the engine load are lower than in the torque regulation region.

The fuel cut execution control module 142 compares the difference between the fuel pressure detected by the fuel pressure sensor 116 and the target fuel pressure (hereinafter, referred to as the fuel pressure difference), with a fuel pressure threshold value at which a pre-ignition might occur (for example, 2 Mpa). Then, the fuel cut execution control module 142 cuts (stops) the fuel supply to the combustion chamber 18, when the fuel pressure difference continues to be equal to or larger than the fuel pressure threshold value for a first time (for example, 0.3 seconds) or more. Although the target fuel pressure is set at approximately 10 MPa for example, it is possible that the target fuel pressure is changed during acceleration or the like, and the fuel pressure difference undesirably becomes equal to or larger than the fuel pressure threshold value, even when the fuel pressure detected by the fuel pressure sensor 116 does not decrease. Hence, the fuel cut execution control module 142 determines whether the fuel pressure difference continues to be equal to or larger than the fuel pressure threshold value for the first time or more.

Thereby, in the engine 10, the fuel is not supplied into the combustion chamber 18, and thus the rotation speed and the torque (load) decrease, to prevent the occurrence of the pre-ignition. Thereafter, the fuel cut execution control module 142 determines whether the operation state of the engine 10 is in the fuel cut restart region (not illustrated in the drawings) in which the rotation speed and the load are lower than in the pre-ignition occurring region, and when the operation state of the engine 10 is in the fuel cut restart region, restarts the fuel supply to the combustion chamber 18, assuming that there is no possibility of the occurrence of the pre-ignition. Note that the fuel cut restart region is a region in which the engine speed and the engine load are lower than in the pre-ignition occurring region, and has a predetermined hysteresis characteristic in relation to the pre-ignition occurring region.

As described above, in the pre-ignition occurrence prevention process, when the operation state of the engine 10 is in the pre-ignition occurring region, and the fuel pressure difference continues to be equal to or larger than the fuel pressure threshold value for the first time or more, the occurrence of the pre-ignition is prevented by cutting the fuel supply. In this way, the damage to the engine 10 by the pre-ignition is prevented as soon as possible.

(Catalyst Device Protection Process)

The catalyst device protection process is executed simultaneously in parallel with the above pre-ignition prevention process. As illustrated in FIG. 2, at the time of an operation state in which the rotation speed of the engine 10 is low, the operation state of the engine 10 is unlikely to enter into the catalyst protection region. However, even when the rotation speed of the engine 10 is low, if the load of the engine 10 is high, for example, if a driver revs while the vehicle is in an idling state, the operation state of the engine 10 might enter into the catalyst protection region.

Thus, first, the catalyst protection determination module 140 determines whether the state is the idling state in which the engine 10 is driven and the vehicle speed detected by the vehicle speed sensor 118 is 0.

Then, when determining that the state is not the idling state, the catalyst protection determination module 140 determines whether the operation state of the engine 10 is in the catalyst protection region illustrated in FIG. 2. Specifically, the catalyst protection determination module 140 makes the determination on the basis of the operation state of the engine 10 and the map indicating the catalyst protection region stored in the ROM in advance. Note that the catalyst protection region is a region in which the combustion in the air exhaust passage 22 might occur, is a region which is in contact with the torque regulation region and in which the engine speed and the engine load are lower than in the torque regulation region, and is a region including the pre-ignition occurring region and including a region of lower rotation speed and lower load than the pre-ignition occurring region.

When the operation state of the engine 10 is in the catalyst protection region, and the air-fuel ratio detected by the air-fuel ratio sensor 120 continues to be higher than an air-fuel ratio threshold value (for example, 1.3) for a second time (for example, 5 seconds) or more, the catalyst protection determination module 140 cuts (stops) the fuel supply to the combustion chamber 18, assuming that the combustion in the air exhaust passage 22 might occur. Note that the air-fuel ratio is 1 at the ideal air-fuel ratio, and increases as the air-fuel ratio becomes leaner.

Thereby, in the engine 10, the fuel is not supplied into the combustion chamber 18, and thus the rotation speed and the torque (load) decrease to prevent the combustion in the air exhaust passage 22. Thereafter, when the operation state of the engine 10 becomes lower than the fuel cut restart line illustrated in FIG. 2, the fuel cut execution control module 142 restarts the fuel supply to the combustion chamber 18, assuming that there is no possibility of the combustion in the air exhaust passage 22. Note that the fuel cut restart line is set at a rotation speed and a load that are lower than in the catalyst protection region, and has a predetermined hysteresis characteristics in relation to the catalyst protection region.

Also, when the vehicle is in the idling state (at the time of low load), the drive control module 136 first performs control in such a manner that the torque of the engine 10 does not become equal to or larger than a constant value because of revving or the like (the second torque regulation). Note that, in the second torque regulation, the torque regulation value is set smaller than in the first torque regulation, because the vehicle is stopping (idling state).

Thereafter, when the air-fuel ratio detected by the air-fuel ratio sensor 120 continues to be higher than the air-fuel ratio threshold value for the second time (for example, 5 seconds) or more, the fuel cut execution control module 142 determines that the uncombusted fuel might combust in the air exhaust passage 22, and cuts (stops) the fuel supply to the combustion chamber 18. Then, the fuel cut execution control module 142 continues cutting the fuel supply to the combustion chamber 18, until the engine 10 stops.

Thereby, in the engine 10, the fuel is not supplied into the combustion chamber 18, and thus the rotation speed and the torque (load) decrease, to stop the engine 10. That is, when the engine 10 is in the idling state, and the air-fuel ratio detected by the air-fuel ratio sensor 120 continues to be higher than the air-fuel ratio threshold value for the second time or more, the fuel supply is stopped until the engine 10 stops.

Figure 3:
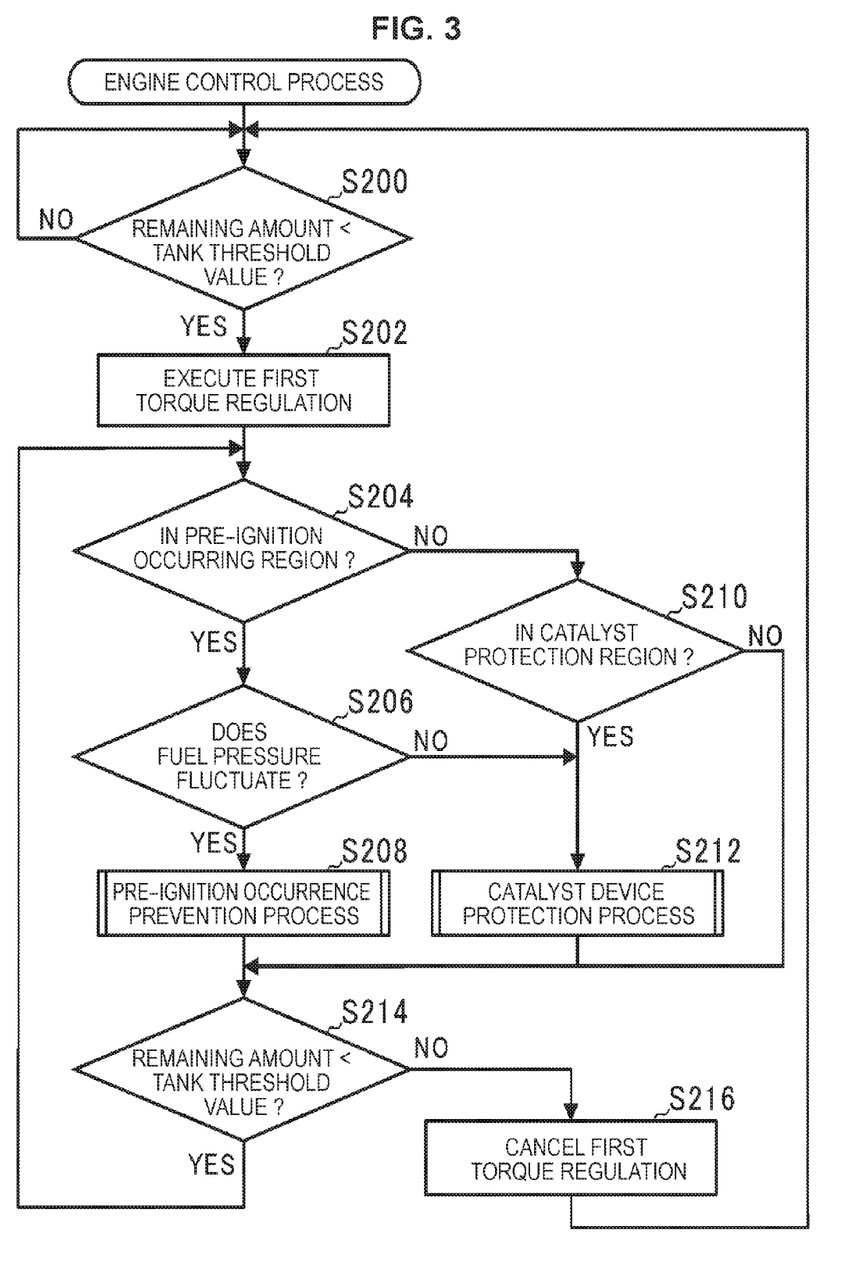
FIG. 3 is a flowchart illustrating an engine control process.

FIG. 3 is a flowchart illustrating an engine 10 control process. As illustrated in FIG. 3, the remaining amount determination module 132 determines whether the remaining amount of the fuel tank detected by the fuel sensor 110 is smaller than the tank threshold value (S200). As a result, if the remaining amount is smaller than the tank threshold value (YES in S200), the drive control module 136 executes the first torque regulation (S202). Also, if the remaining amount is equal to or larger than the tank threshold value (NO in S200), the process of S200 is repeated.

Thereafter, the pre-ignition determination module 138 determines whether the operation state of the engine 10 is in the pre-ignition occurring region (including the region that is superimposed on the catalyst protection region) (S204), and if the operation state of the engine 10 is determined to be in the pre-ignition occurring region (YES in S204), the fuel cut execution control module 142 determines whether the fuel pressure detected by the fuel pressure sensor 116 fluctuates (S206). Then, if it is determined that the fuel pressure fluctuates (YES in S206), the pre-ignition occurrence prevention process is executed (S208).

Also, if the operation state of the engine 10 is determined to be not in the pre-ignition occurring region (NO in S204), the catalyst protection determination module 140 determines whether the operation state of the engine 10 is in the catalyst protection region (S210). As a result, if the operation state of the engine 10 is determined to be in the catalyst protection region (YES in S210), and if it is determined that the fuel pressure does not fluctuate (NO in S206), the catalyst device protection process is executed (S212). Also, if it is determined that the operation state of the engine 10 is not in the catalyst protection region (NO in S210), the next process (S214) starts.

After the pre-ignition occurrence prevention process (S208) or the catalyst device protection process (S212) is executed, the remaining amount determination module 132 determines whether the remaining amount of the fuel tank is smaller than the tank threshold value (S214), and if the remaining amount is smaller than the tank threshold value (YES in S214), returns to the process of S204. On the other hand, if the remaining amount is equal to or larger than the tank threshold value (NO in S214), the vehicle does not run short of the fuel, and therefore the drive control module 136 cancels the first torque regulation (S216), and returns to the process of S200, in order to execute the engine control process repeatedly.

Figure 4:
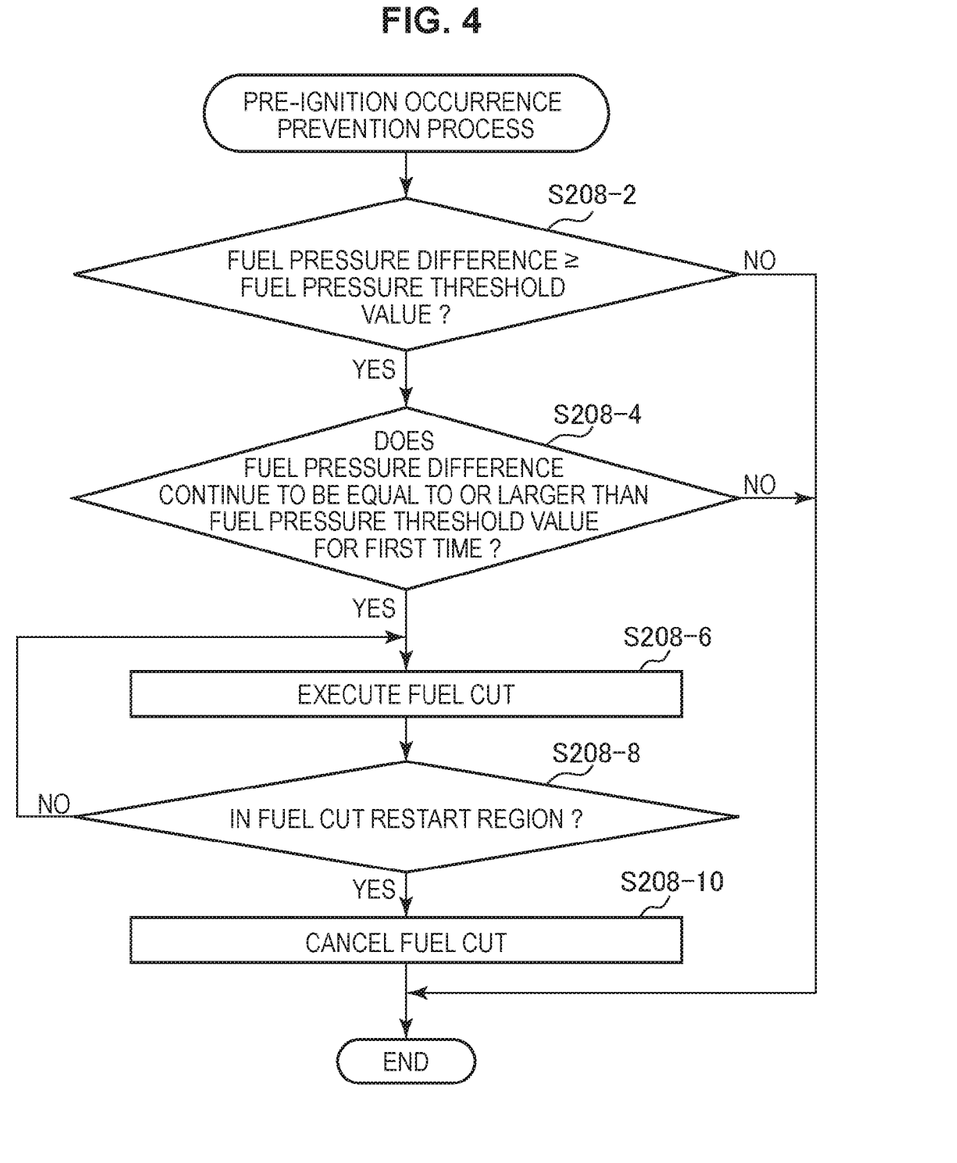
FIG. 4 is a flowchart illustrating a pre-ignition occurrence prevention process.

FIG. 4 is a flowchart illustrating the pre-ignition occurrence prevention process. As illustrated in FIG. 4, when the pre-ignition occurrence prevention process (S208) is started, the fuel cut execution control module 142 determines whether the difference between the detected fuel pressure and the target fuel pressure (the fuel pressure difference) is equal to or larger than the fuel pressure threshold value (S208-2). If the fuel pressure difference is equal to or larger than the fuel pressure threshold value (YES in S208-2), the fuel cut execution control module 142 determines whether the fuel pressure difference continues to be equal to or larger than the fuel pressure threshold value for the first time or more (S208-4).

Then, if the fuel pressure difference continues to be equal to or larger than the fuel pressure threshold value for the first time or more (YES in S208-4), the fuel cut execution control module 142 executes the fuel cut to prevent the occurrence of the pre-ignition (S208-6).

Thereafter, the pre-ignition determination module 138 determines whether the operation state of the engine 10 is in the fuel cut restart region (S208-8). As a result, if the operation state of the engine 10 is in the fuel cut restart region (YES in S208-8), the fuel cut execution control module 142 cancels the fuel cut (S208-10), and ends the pre-ignition occurrence prevention process. On the other hand, if the operation state of the engine 10 is not in the fuel cut restart region (NO in S208-8), the fuel cut execution control module 142 returns to the process of S208-6.

Also, if the fuel pressure difference is smaller than the fuel pressure threshold value (NO in S208-2), or if the fuel pressure difference does not continue to be equal to or larger than the fuel pressure threshold value for the first time or more (NO in S208-4), the pre-ignition occurrence prevention process ends.

Figure 5:
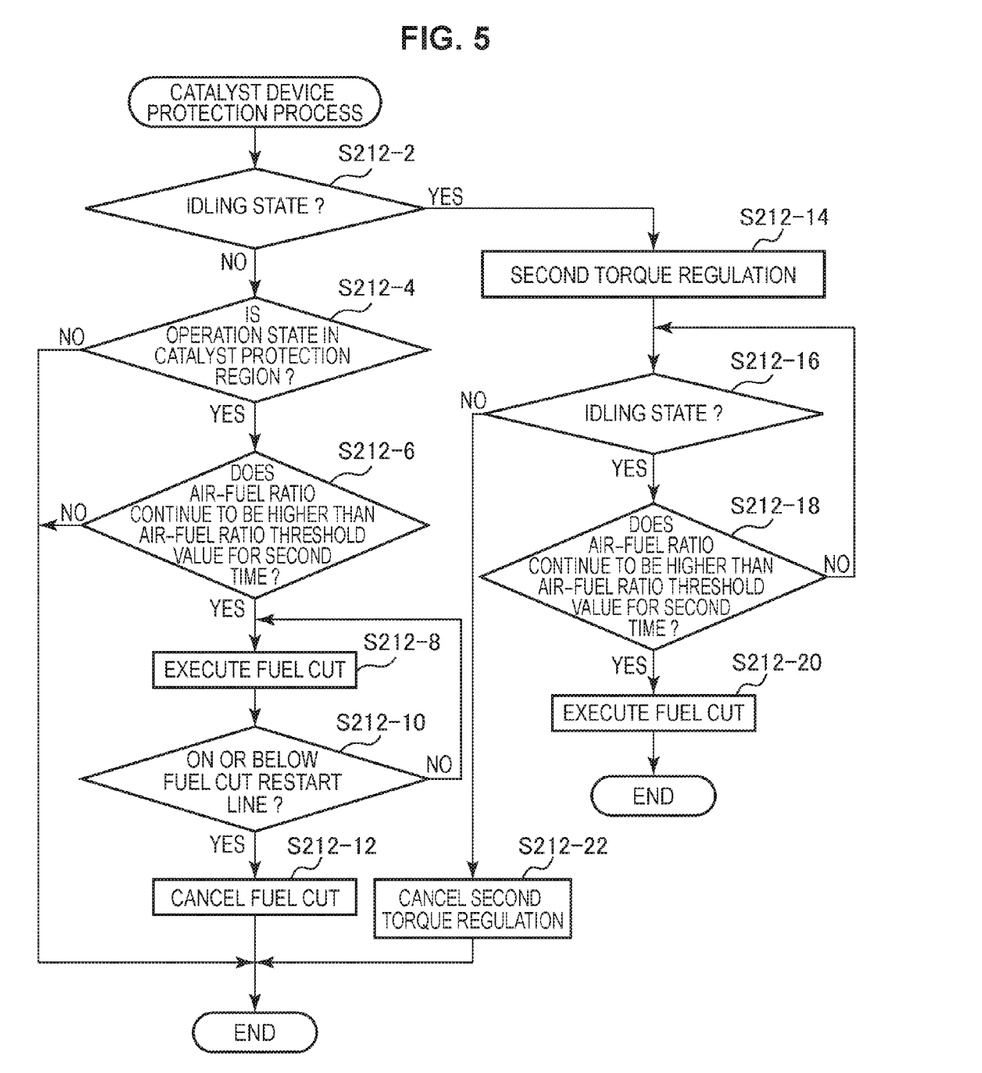
FIG. 5 is a flowchart illustrating a catalyst device protection process.

FIG. 5 is a flowchart illustrating the catalyst device protection process. As illustrated in FIG. 5, when the catalyst device protection process (S212) is started, the drive control module 136 determines whether the vehicle is in the idling state, on the basis of the state of the vehicle (S212-2).

As a result, if the vehicle is not in the idling state (NO in S212-2), the catalyst protection determination module 140 determines whether the operation state of the engine 10 is in the catalyst protection region (S212-4). As a result, if the operation state is in the catalyst protection region (YES in S212-4), the fuel cut execution control module 142 determines whether the air-fuel ratio detected by the air-fuel ratio sensor 120 continues to be higher than the air-fuel ratio threshold value for the second time or more (S212-6).

If the air-fuel ratio detected by the air-fuel ratio sensor 120 continues to be higher than the air-fuel ratio threshold value for the second time or more (YES in S212-6), the fuel cut execution control module 142 executes the fuel cut to prevent the temperature of the exhaust gas from rising (S212-8).

After the fuel cut is executed (S212-8), the catalyst protection determination module 140 determines whether the operation state of the engine 10 is on or below the fuel cut restart line (S212-10). As a result, if the operation state of the engine 10 is not on or below the fuel cut restart line (NO in S212-10), the process returns to S212-8. On the other hand, if the operation state of the engine 10 is on or below the fuel cut restart line (YES in S212-10), the fuel cut execution control module 142 cancels the fuel cut (S212-12), and ends the catalyst device protection process.

Also, if the operation state is not in the catalyst protection region (NO in S212-4), and if the air-fuel ratio detected by the air-fuel ratio sensor 120 does not continue to be higher than the air-fuel ratio threshold value for the second time or more (NO in S212-6), the catalyst device protection process ends.

Also, if the vehicle is in the idling state (YES in S212-2), the drive control module 136 executes the second torque regulation (S212-14). Thereafter, the drive control module 136 determines whether the vehicle is in the idling state, again (S212-16). As a result, if the vehicle is in the idling state (YES in S212-16), the fuel cut execution control module 142 determines whether the air-fuel ratio detected by the air-fuel ratio sensor 120 continues to be higher than the air-fuel ratio threshold value for the second time or more (S212-18).

As a result, if the air-fuel ratio detected by the air-fuel ratio sensor 120 continues to be higher than the air-fuel ratio threshold value for the second time or more (YES in S212-18), the fuel cut execution control module 142 executes the fuel cut to stop the engine 10 (S212-20), and ends the catalyst device protection process.

On the other hand, if the vehicle is not in the idling state (NO in S212-16), the drive control module 136 cancels the second torque regulation (S212-22), and ends the catalyst device protection process.

Also, if the air-fuel ratio detected by the air-fuel ratio sensor 120 does not continue to be higher than the air-fuel ratio threshold value for the second time or more (NO in S212-18), the process returns to S212-16.

As described above, in the engine control device 100 of the present implementation, the pre-ignition occurrence prevention process and the catalyst device protection process are executed simultaneously and parallelly, to prevent the occurrence of the pre-ignition and the temperature rising of the exhaust gas, in order to prevent the occurrence of the pre-ignition and the rise of the exhaust gas temperature appropriately. Thereby, in the engine control device 100, hardware such as each component of the engine 10 and the catalyst device 40 is protected appropriately at the time of fuel shortage.

Also, in the pre-ignition occurrence prevention process, the occurrence of the pre-ignition is prevented in advance, not on the basis of the air-fuel ratio detected by the air-fuel ratio sensor 120, but on the basis of the fuel pressure detected by the fuel pressure sensor 116, and therefore the hardware of the engine 10 and the like is protected in an early stage.

Although the preferred implementations of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

The present invention can be utilized in an engine control device that protects an engine.

The invention claimed is:

1. An engine control device comprising:
a remaining amount detection unit that detects a remaining amount of a fuel tank;
a remaining amount determination module that determines whether the remaining amount of the fuel tank detected by the remaining amount detection unit is smaller than a tank threshold value indicating fuel shortage;
a rotation speed detection unit that detects a rotation speed of an engine;
a load calculating module that calculates a load of the engine;
a pre-ignition determination module that determines whether an operation state of the engine indicated by the rotation speed detected by the rotation speed detection unit and the load calculated by the load calculating module is in a pre-ignition occurring region;
a catalyst protection determination module that determines whether the operation state of the engine is in a catalyst protection region; and
a fuel cut execution control module that stops a fuel supplied to the engine, when the remaining amount of the fuel tank is determined to be smaller than the tank threshold value and the operation state of the engine is determined to be in the pre-ignition occurring region, and when the remaining amount of the fuel tank is determined to be smaller than the tank threshold value and the operation state of the engine is determined to be in the catalyst protection region.

2. The engine control device according to claim 1, further comprising:
a fuel pressure detection unit that detects a pressure of the fuel supplied to the engine,
wherein the fuel cut execution control module stops the fuel supplied to the engine, when a difference between the fuel pressure detected by the fuel pressure detection unit and a target fuel pressure continues to be equal to or larger than a fuel pressure threshold value for a first time or more.

3. The engine control device according to claim 2, further comprising:
an air-fuel ratio detection unit that detects an air-fuel ratio of the engine,
wherein the fuel cut execution control module stops the fuel supplied to the engine, when the air-fuel ratio detected by the air-fuel ratio detection unit continues to be higher than an air-fuel ratio threshold value for a second time or more, the second time being longer than the first time.

4. An engine control device comprising:
a remaining amount detection unit that detects a remaining amount of a fuel tank;
a remaining amount determination module that determines whether the remaining amount of the fuel tank detected by the remaining amount detection unit is smaller than a tank threshold value indicating fuel shortage;

a rotation speed detection unit that detects a rotation speed of an engine;

a load calculating module that calculates a load of the engine;

a pre-ignition determination module that determines whether an operation state of the engine indicated by the rotation speed detected by the rotation speed detection unit and the load calculated by the load calculating module is in a pre-ignition occurring region; and a fuel cut execution control module that stops a fuel supplied to the engine, when the remaining amount of the fuel tank is determined to be smaller than the tank threshold value and the operation state of the engine is determined to be in the pre-ignition occurring region.

* * * * *